US007806099B2

(12) United States Patent
Nielsen

(10) Patent No.: US 7,806,099 B2
(45) Date of Patent: Oct. 5, 2010

(54) CENTRALISED LUBRICATION OF LARGE DIESEL ENGINES

(75) Inventor: Ib Helmer Nielsen, Brønderslev (DK)

(73) Assignee: Hans Jensen Lubricators A/S, Hadsund (DK)

( * ) Notice: Subject to any disclaimer, the term of this patent is extended or adjusted under 35 U.S.C. 154(b) by 0 days.

(21) Appl. No.: 10/577,545

(22) PCT Filed: Oct. 28, 2004

(86) PCT No.: PCT/DK2004/000745

§ 371 (c)(1),
(2), (4) Date: Sep. 11, 2006

(87) PCT Pub. No.: WO2005/040564

PCT Pub. Date: May 6, 2005

(65) Prior Publication Data

US 2007/0074697 A1 Apr. 5, 2007

(30) Foreign Application Priority Data

Oct. 28, 2003 (DK) .............................. 2003 01582

(51) Int. Cl.
*F01M 1/14* (2006.01)
*F01M 1/08* (2006.01)
*F16N 7/38* (2006.01)

(52) U.S. Cl. ................................................ 123/196 R

(58) Field of Classification Search ............ 123/196 R, 123/196 M, 196 CP; 184/14, 18, 6.8, 27.2
See application file for complete search history.

(56) References Cited

U.S. PATENT DOCUMENTS 3,367,250 A * 2/1968 Ytterberg .................... 404/112
4,779,031 A * 10/1988 Arends et al. ............... 318/565

(Continued)

FOREIGN PATENT DOCUMENTS

DE 3909772 10/1989

(Continued)

OTHER PUBLICATIONS

Translation of German Patent DE 3909772 A entitled "Lubricating Device for a Cylinder of an Internal Combustion Engine". McElroy Translation Company. Apr. 2008.*

*Primary Examiner*—M. McMahon
(74) *Attorney, Agent, or Firm*—James Creighton Wray; Meera P. Narasimhan

(57) ABSTRACT

A centralised lubrication system and method lubricates cylinder faces in large diesel engines, particularly marine engines. At least one lubricating apparatus has a rotating control shaft preferably running synchronously with the engine main shaft. To make a system that does not have a mechanical drive between the lubricating apparatus and the main shaft, the system is constructed with an AC motor driving the control shaft. Reference means are provided in association with the main shaft, indicating the angular position of the main shaft, and sensor means detect the position of the reference means. The system includes a control unit receiving signals from the sensor and detecting angular position as well as angular speed of the reference means and the main shaft. The control unit is connected with and controls the AC motor (36) for regulating the rotation of the control shaft (18) and thereby actuation of reciprocating pumps providing the cylinder lubrication.

13 Claims, 4 Drawing Sheets

U.S. PATENT DOCUMENTS

| | | | | | |
|---|---|---|---|---|---|
| 5,040,507 | A | * | 8/1991 | Hayes et al. | 123/339.2 |
| 5,408,894 | A | * | 4/1995 | Henson | 73/866.5 |
| 5,698,031 | A | * | 12/1997 | Winkle | 118/264 |
| 5,945,828 | A | * | 8/1999 | Katogi et al. | 324/399 |
| 6,058,766 | A | * | 5/2000 | Onuma et al. | 73/117.3 |

FOREIGN PATENT DOCUMENTS

| | | | | |
|---|---|---|---|---|
| EP | 11193900 | | | 7/1999 |
| JP | 55-142233 | A | * | 11/1980 |
| JP | 59-54717 | A | * | 3/1984 |
| JP | 11/193900 | | | 7/1999 |
| WO | WO 02/095196 | | | 11/2002 |
| WO | WO 02/095196 | A1 | * | 11/2002 |

* cited by examiner

CENTRALISED LUBRICATION OF LARGE DIESEL ENGINES

This application claims the benefit of Danish Application No. PA 2003 01582 filed Oct. 28, 2003 and PCT/DK2004/000745 filed Oct. 28, 2004, which are hereby incorporated by reference in their entirety.

BACKGROUND OF THE INVENTION

The present invention concerns a centralised lubrication system for lubricating the cylinder faces in large diesel engines, particularly marine engines, including at least one lubricating apparatus with a number of reciprocating pumps actuated by cams on a rotating control shaft which is driven preferably synchronously with the main shaft of the diesel engine.

Furthermore, the present invention concerns a method for lubricating the cylinder faces in large diesel engines, particularly marine engines, including at least one lubricating apparatus with a number of reciprocating pumps actuated by cams on a rotating control shaft which is driven preferably synchronously with the main shaft of the diesel engine.

The lubricating apparatuses are traditionally designed as pump units mounted in close association with their respective cylinders, and which are connected to a supply reservoir for lubricating oil and with oil injection nozzles at different positions on the cylinder lining. Each pump unit includes a plurality of reciprocating pumps that supply oil to various lubrication points and are driven by a common rotating control shaft with cams provided thereon. By the rotation of the shaft, the cams interact with thrust heads on respective axially displacing pistons which are spring loaded in direction towards the control shaft, so that by the rotation of the shaft, the pistons will perform reciprocating movements for actuating the pistons of the reciprocating pumps.

For many years, lubricating apparatuses have operated under the operational condition that the delivery pressure from the reciprocating pumps did not have to be very high, since it is standard that the oil is to be injected in the cylinder during the upwards return stroke of the engine piston, i.e. in the course of the compression, however before the succeeding work stroke by the ignited combustion. Operation with injection or pumping pressure in the magnitude of 10 bars has thus been current.

In recent years, proposals have been made for making the lubrication more efficient by injecting the oil through atomising nozzles for achieving an oil mist lubrication during the upwards movement of the piston. Hereby the oil is, however, supplied at a far higher pressure for ensuring fine atomisation through atomising nozzles, e.g. pressures up to 100 bar or more.

In both systems, the control shaft is driven through a direct or indirect mechanical coupling with the crankshaft of the engine, whereby it becomes possible to establish power for pump actuation and simultaneously to achieve synchronisation between the engine crankshaft and the control shaft of the lubricating apparatus.

A pump unit may e.g. include a box-shaped apparatus housing carrying a row of reciprocating pumps on a wall. The unit has a valve housing with an inlet for lubricating oil, an intermediate section for accommodating a piston that protrudes into the apparatus housing and an outlet for reciprocating pump thus formed. The outlet is connected to a connector from which connecting pipes emanate to the lubrication points on the associated engine cylinder, e.g. in a number of 6-24.

The pistons are actuated for pressing in by means of actuation cams/rocker arms on a through-going control shaft which is rotated synchronously with the crankshaft of the engine. The pistons are spring biased towards the actuation cams. A set screw is provided, defining the extreme position for an associated actuation cam. The set screws may be operated for determining individual operational strokes of the pistons and thereby the associated yields of the individual reciprocating pumps.

With the mechanical coupling, there is a limitation in the possibilities of the user for controlling the injection time only for synchronised lubrication which is timed according to the rotation of the crankshaft. Furthermore, in the future it may be considered realistic that mechanical drives for the lubrication apparatus will disappear.

In some operational situations, it will be desirable to establish a non-synchronised cylinder lubrication, i.e. a cylinder lubrication which is not dependent on the rotational and angular position of the crankshaft. This is e.g. the case with prelubricating the cylinders, where the user has the possibility of interfering by providing a cylinder lubrication before starting the engine, and thereby before the rotation of the crankshaft has started. This is also the case for overruling a so-called slowdown where an error signal can cause reduction of the engine revolutions at a critical time, e.g. when manoeuvring in a harbour.

SUMMARY OF THE INVENTION

It is the purpose of the present invention to indicate a system and a method whereby it is possible to establish the cylinder lubrication in such a way that the user may optionally establish a synchronised cylinder lubrication as well as a non-synchronised cylinder lubrication in operational situations where desired, and it is particularly the purpose that this may occur without using mechanical drive between the main shaft of the diesel engine and the control shaft in the lubricating apparatus.

According to the present invention, this is achieved with a centralised lubrication system that is peculiar in including:

- an AC motor connected with and driving the control shaft;
- means for detecting speed, direction of movement and position of the engine piston and for generating digital or electric signals indicating these parameters;
- a control unit which is adapted for receiving the digital/electric signals and which is connected with and controls the AC motor for regulating the rotation of the control shaft and thereby the actuation of the reciprocating pumps.

The method according to the invention is peculiar in that:

- the control shaft is driven by AC motor;
- detection of speed, direction of movement and position of engine piston is performed;
- digital or electric signals indicating these parameters are generated;
- the digital/electric signals are transmitted to a control unit which is connected with and controls the AC motor for regulating the rotation of the control shaft and thereby the actuation of the reciprocating pumps.

It may be said that the system according to the invention is based on servo-control based on a digital/electronic reference signal that indicates the speed, direction and position of the piston, for in that way to lubricate at the right time in the piston cycle and which is used for controlling the AC motor/servomotor. This motor is used for driving the control shaft of the lubricating apparatus so that lubricating apparatus and main shaft may be brought to run timed (synchronously or asynchronously) via the control of the control unit. Control may be performed depending on what is wanted in a given operational situation, and since there is no direct mechanical drive between the main shaft and the control shaft, these may also be brought to run asynchronously.

Regarding the function of the invention, it is secondary where the signals come from and from which engine components they are generated. The signals may thus be generated from different parts/functions on the diesel engine.

According to a preferred embodiment, the system according to the invention is peculiar in reference means connected with the main shaft and which directly or indirectly indicate the position of the main shaft and thereby also the position of the piston;

sensor means detecting the position of the reference means; and that the control unit is connected with and receives signals from sensor means and includes means for detecting angular position as well as angular speed for the reference means and thereby for the main shaft/engine piston.

According to a preferred embodiment, the method according to the invention is peculiar in that the digital/electric signals are established by reference means which are connected with the main shaft and which directly or indirectly indicate the position of the main shaft and thereby also the position of the piston, and sensor means that detect the position of the reference means; and that the control unit is connected with and receives signals from sensor means and includes means for detecting angular position as well as angular speed for the reference means and thereby for the main shaft/engine piston.

From the AC motor/lubricating apparatus a reference signal is returned to the control unit/servo-control. The reference signals are compared with a reference signal from the main shaft or from a sensor detecting the position of the piston, and possible adjustment of the speed of the AC motor is performed automatically if necessary to achieve the desired timed lubrication of the cylinder. For controlling the servo-control, reference signals from the main shaft/pistons of the diesel engine and the AC motor/lubricating apparatus are thus to be used.

A system according to the invention may be based on standard components. This is advantageous, as hereby it is possible to perform a relatively simple rebuilding of existing lubricating systems in order to achieve the advantages of the present invention. By and large, it is possible to keep lubrication apparatuses in their present design, which of course would be a significant advantage. It is only required to provide a drive motor and a control therefor which can coordinate rotation of the control shaft with the position of the crankshaft/piston of the diesel engine.

According to a particular embodiment, the system according to the invention is peculiar in that the sensors include two reference sensors that are mutually displaced in the circumferential direction of the main shaft. Hereby it is possible to detect whether the main shaft is rotating one or the other way.

In a particularly simple design it is preferred that the reference means include teeth on a toothed rim that is preferably disposed on the flywheel of the main shaft. The toothed rim is usually provided beforehand, and the teeth thus provide well-defined reference means that are evenly distributed along the entire circumference of the main shaft. The tooth pitch will thus determine the accuracy of the system. For example, by a tooth pitch of 3°, in the worst case there will be a 3° error at the injection. The teeth will normally be disposed with so small pitch that a possible error will not have any practical significance for the injection.

According to a further embodiment, the system according to the invention is peculiar in that the reference means include an index reference means, and that the sensor means include an index sensor for detecting the position of the index reference means. Hereby it is possible to establish a point of origin. From this point of origin, the teeth with the two reference sensors are counted.

It is the primary task of the system to ensure that the lubricating apparatuses are running angularly synchronously with the main shaft of the diesel engine so that a timed cylinder lubrication is achieved. The timing may be adjusted according to the need via the control unit.

When the diesel engine is stopped or running, and a pre-lubrication of the cylinders is wanted, it is possible to perform a pre-lubrication of the cylinders. This is effected by controlling the AC motor independently of the reference signal from the main shaft/pistons. The reference signal may be overruled via the control unit. After applying the pre-lubrication function, synchronisation may be attained again automatically. In a particular embodiment, this occurs after a 360° rotation of the main shaft.

According to a particular embodiment, there is provided a backup servo-control and a switch so that switching to the backup servo-control is made automatically in case of an error in the system. This is effected via the control unit which controls the switch The backup servo-control can be timed or not timed.

The reference signals from the main shaft may come from an angle encoder or corresponding detecting means. According to a particular embodiment, it is preferred that the angular position is indicated with an accuracy which is to be no less than about 4°, and which preferably has signal level that maintains HTL or TTL signal level. In a particular embodiment, the reference signals are present in duplicate versions that are mutually independent, also with regard to supply voltage. This is advantageous with regard to the reliability of the system.

Alternatively, the reference signals from the main shaft may be established via inductive sensors that together provide position, speed and direction of the main shaft.

The reference signals from the electric motor/lubricating apparatus are established according to a particular embodiment by a combination of signals. A resolver is built into the AC motor and from the signal of which the control can determine the rotational speed, rotational direction and relative position of the AC motor. On the lubricating apparatus there is mounted an inductive sensor indicating the timing point of the lubricating apparatus, i.e. the position of the lubricating apparatus. By combining theses signals a well-defined reference signal is attained for the AC motor/lubricating apparatus.

According to a further embodiment for the system according to the invention, there is provided a monitoring arrangement which is arranged for automatic switch to the backup servo-control in case of an error. Furthermore, it is adapted for providing an error message to a local operating panel and to the overall control that is usually found on the bridge of the ship where the diesel engine is used.

The monitoring arrangement supervises both master and backup controls with regard to errors concerning servo-drive, reference signals, AC motor, supply voltage and synchronisation between the reference signals.

The system is arranged so that error messages in the backup system will produce a slow-down signal for the main engine simultaneously with an error message to the overall control. If necessary in the situation, it will be possible to override this slowdown signal via the control unit.

The invention is explained in detail in the following with reference to the drawing, where:

DETAILED DESCRIPTION OF THE PREFERRED EMBODIMENTS

Figure 1:
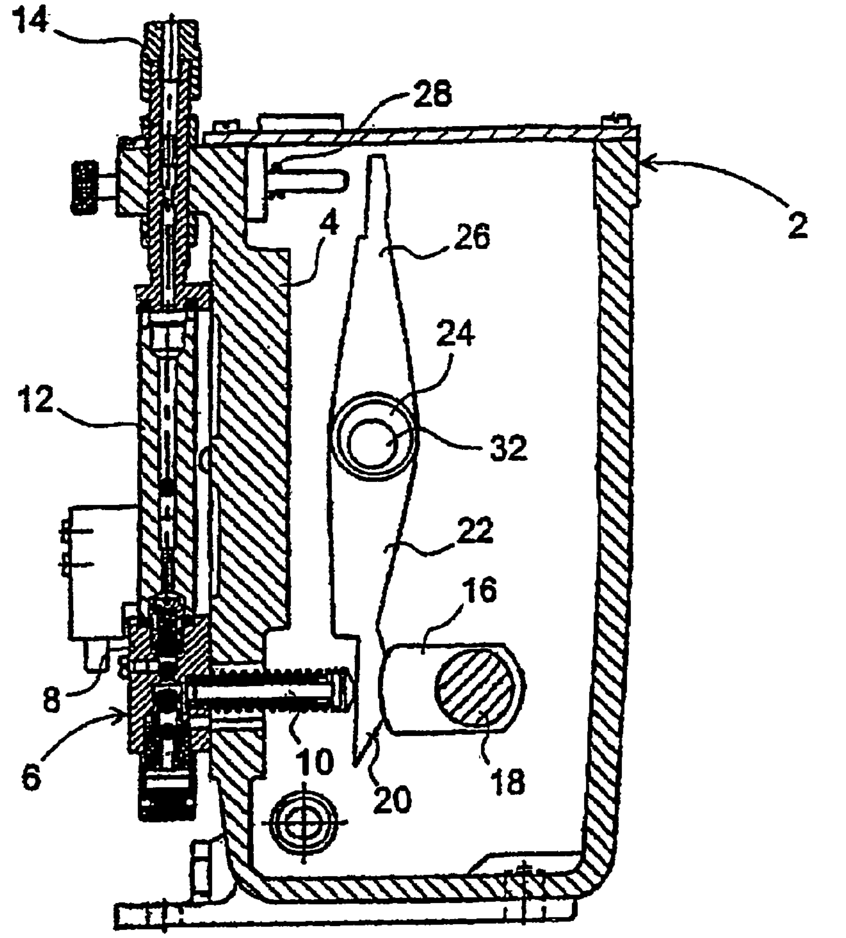
FIG. 1 shows a sectional view of an embodiment of a conventional lubricating apparatus that may be used in a system according to the present invention.
Figure 2:
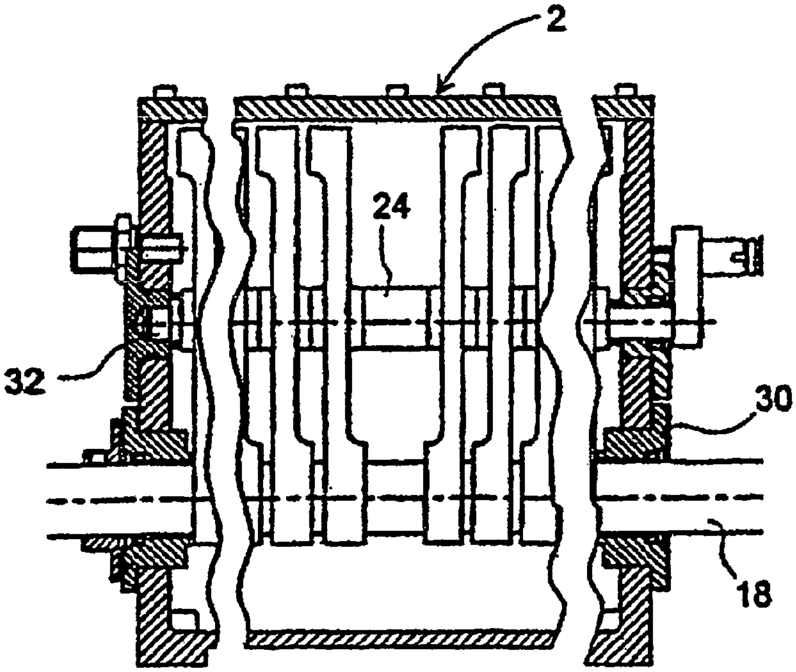
FIG. 2 shows a longitudinal section of the lubricating apparatus shown in FIG. 1.

The apparatus shown in FIGS. 1 and 2 has a box-shaped apparatus housing 2 which on a front wall 4 carries a row of reciprocating pump units 6, of which only one is shown in FIG. 1. The unit has a valve housing 8 with a lower inlet for lubricating oil, an intermediate section for accommodating a piston 10 protruding into the apparatus housing 2 and an upper outlet for reciprocating pump thus formed. The outlet is connected to an upper connector 14 via a flow indicator 12, and from the whole row of these connectors connecting pipes emanate to the lubrication points on the associated engine cylinder, e.g. in a number of 6-24.

The pistons 10 are actuated for pressing in by means of actuation cams 16 on a through-going control shaft 18 which is rotated synchronously with the crankshaft of the engine, and which is seated in bearing cases 30. The pistons are not actuated directly, but via thrust pads 20 on respective rocker arms 22 which are pivoting about a fixed journal 24 with eccentric end journals 32 and have upward extensions 26 that interact at the top with respective set screws 28 projecting inwards from the front wall. The pistons 10 are spring loaded in direction inwards against the thrust pads 20 which they will then keep pressed inwards until the respective upper arms ends engage the set screws 28. Hereby, for each pumping unit the initial position is determined from which each of the thrust pads 20 will be pressed outwards at the passage of the associated actuating cam 16.

In operation, in some situations there is to be a certain distance between the arm part 26 and the set screw 28 so that the thrust pad 20 during the cam passage will be pressed outwards for operating the piston 10, and after this passage it will travel back to the said initial position under the action of the spring force by the piston. The set screws may hereby be operated for determining individual operational strokes of the pistons and thereby the associated yields of the individual pump units.

Figure 3:
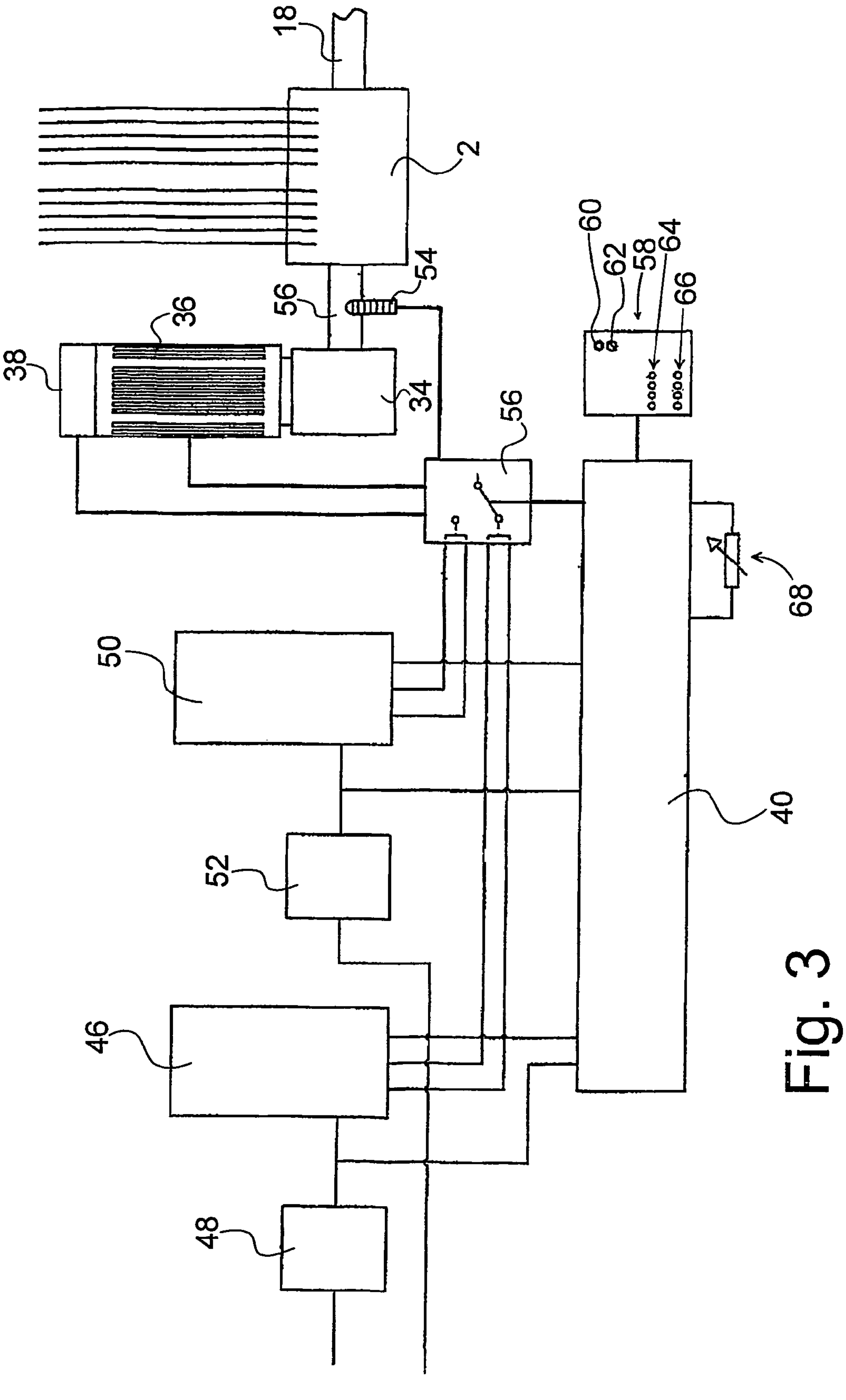
FIG. 3 shows a block diagram of elements forming part of a system according to the invention.

In FIG. 3 there is shown a block diagram that illustrates the essential elements forming part of an embodiment of a system according to the invention. In order to be operational, a system has to contain further elements, e.g. voltage supply, but such further elements will, however, be within the options of the skilled in the art in the light of the present description.

FIG. 3 shows a lubricating apparatus 2 with its control shaft 18 connected to a gear 34 which is driven by an AC motor. The gear steps down the rotational speed of the motor 36 by a ratio selected with regard to a desired rotational speed of the shaft 18 of the lubricating apparatus. A resolver 38 is fitted on the AC motor 36, adapted for detecting and transmitting a signal regarding the actual angular position of the AC motor to a control unit 40.

A reference signal for the angular position of the main shaft 44 (see FIG. 4) is transmitted from the flywheel of the diesel engine 42 (see FIG. 4) to a master servo drive 46 which via the control unit 40 controls the AC motor so that the lubricating apparatus may run angularly synchronously with the main shaft 44. The master servo drive 46 contains programmable regulator and control element. A signal converter 48 is used for converting/adapting the reference signal from the flywheel and is connected between the master servo drive 46 and the control unit 40.

Correspondingly, the system includes backup servo drive 50 and backup signal converter 52. These are used for emergency operation in case of error in the master system.

The system includes an index sensor 54 which is disposed in connection with a drive shaft 56 connecting the gear 34 and the control shaft 18. This index sensor 54 is used for determining the absolute position of the lubricating apparatus. Since the resolver 38 is placed on the AC motor and since the gear 34 is disposed between the AC motor 36 and the control shaft 18 of the lubricating apparatus, the index sensor is required for establishing the absolute position of the control shaft 18 of the lubricating apparatus. The signal from the index sensor 54 is transmitted to the control unit 40.

The control unit 40 receives reference signals from sensors regarding position of the main shaft 44 and the AC motor 36/lubricating apparatus 18. Furthermore, the control unit 40 monitors the function of the system elements and may, via a control changeover switch 56, switch to the backup system, if an error exists in the master system. The control changeover switch 56 will thus be used for switching between master servo-drive 46 or backup servo-drive 50 being connected to the AC motor 36.

The system includes a local operating panel 58. This has a switch 60 for establishing pre-lubrication and switch 62 for switching between manual or automatic operation. Furthermore, it has alarm indicators 64 and status indicators 66.

The control unit 40 is connected to a regulating button 68 for adjusting the timing for injection of lubricating oil into the cylinder. The adjustment capability is between 0 and 360°.

Figure 4:
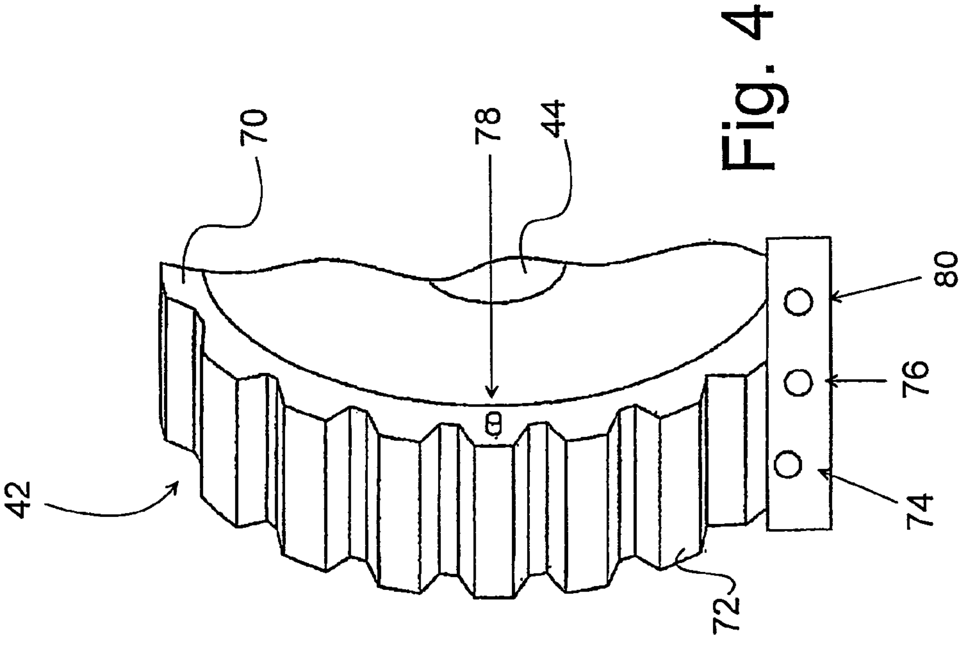
FIG. 4 shows a partially perspective view of a flywheel for a diesel engine and elements used for indicating the angular position of the flywheel.

FIG. 4 shows the flywheel 42 including a toothed rim 70 which is provided with teeth 72 along its circumference. The teeth 72 are used a reference means for indicating the angular position of the main shaft and thereby also the position of the piston. Two sensors 74, 76 are provided which are arranged for detecting the presence of a tooth 72 opposite the sensor and which are mutually displaced in the circumferential direction of the main shaft. By this it may be detected if the main shaft 44 is turning one way or the other, based on detection of the time delay by the sensors 74, 76.

At the side of the toothed rim 70 there is provided a 0° index reference 78 in the shape of a projecting pin which is detected by an index sensor 80. A starting point for counting the teeth 72 may hereby be provided. The position of the index reference 78 in relation to the position of the piston/main shaft is used for setting the timing point of the lubricating apparatus 2. All three sensors 74, 76 and 80 are preferably inductive proximity sensors.

Figure 5:
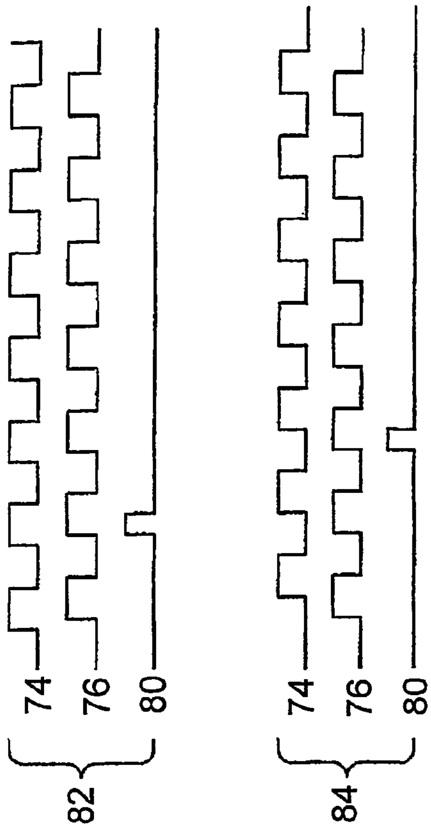
FIG. 5 shows an example of reference signals achieved by using the elements shown in FIG. 4 by a method according to the invention.

FIG. 5 shows two examples 82, 84 of reference signals collected by the sensors 74, 76 and 80. The two examples 82, 84 show the rotation of the main shaft in opposite directions. The difference in detecting the teeth 72 with the sensors 74 and 76 expresses the direction of rotation.

Figure 6:
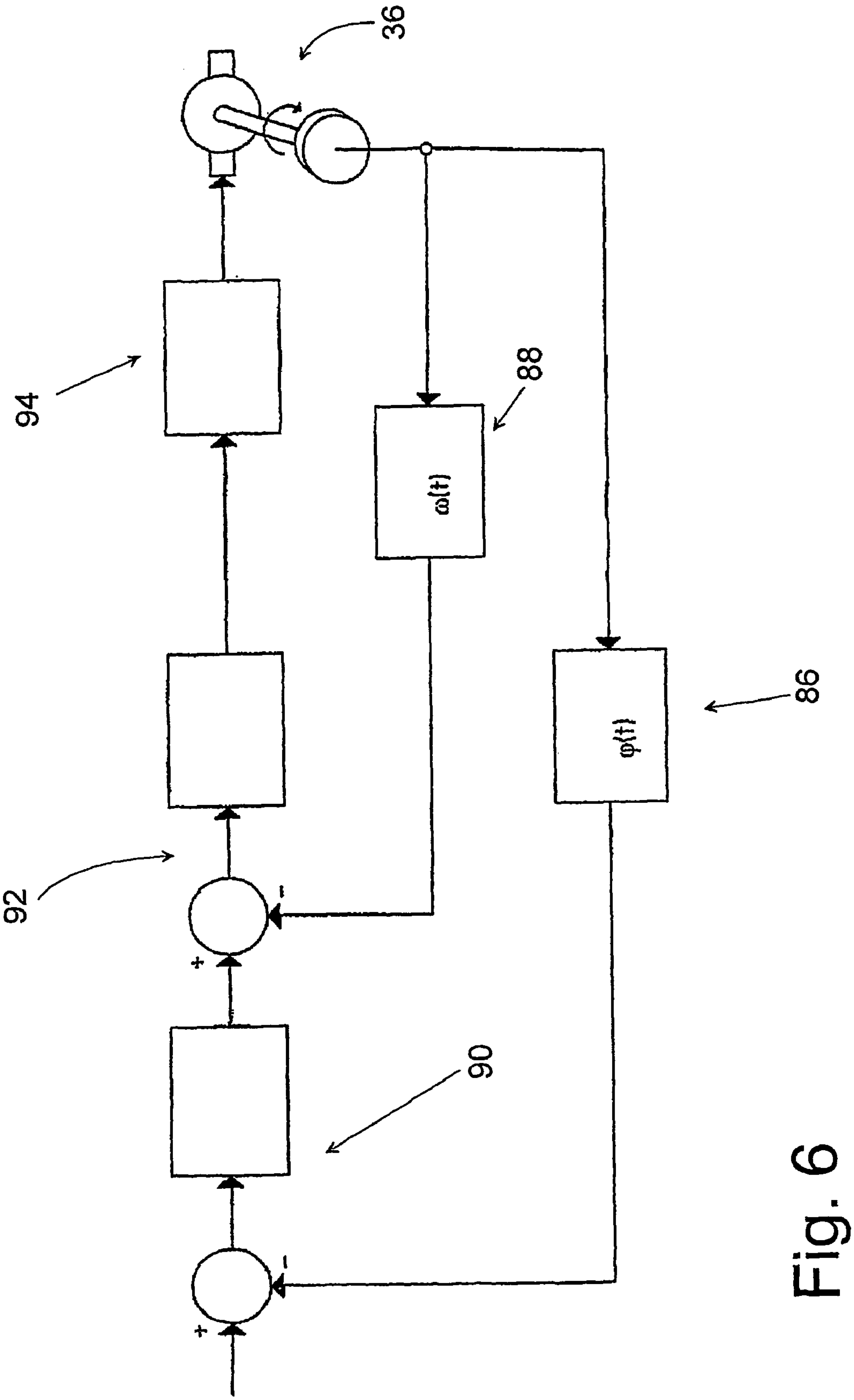
FIG. 6 shows a schematic diagram for a control loop by the method according to the invention.

A control loop, as shown in FIG. 6, includes an angular position indicator 86 and an angular speed meter 88. The signal of the angular position indicator 86 is transmitted to a first regulator 90 together with the reference signal from the main shaft/piston. The regulated signal is then transmitted to a second regulator 92 together with the signal from the angular speed meter 88 for possible compensation/adjustment on the basis of angular speed. The resulting signal is transmitted to a control element 94 which performs possible adjustment of the AC motor 36. By using this double control loop, one may on the basis of the speed predict the expected future position of the reference point and may thereby control the AC motor very accurately.

The invention claimed is:

1. A centralised lubrication system for lubricating cylinder faces in large diesel engines, and marine engined, including at least one lubricating apparatus with a number of reciprocating pumps actuated by cams on a rotating control shaft which is a driven shaft, reference means connected with a main shaft of a diesel engine and the reference means directly or indirectly indicates position of the main shaft and thereby also position of the an engine piston, sensor means for detecting position of the reference means and thereby angular position as well as angular speed for the mainshaft, and said sensor means generating digital or electrical signals indicating these parameters, and a control unit which is connected to and receives said digital or electrical signals from said sensor means and wherein the control unit includes means to detect the angular position as well as the angular speed for the reference means and thereby for the main shaft/engine piston wherein said system includes:

an AC motor connected with and driving the control shaft;

signal converter means connected to the sensor means and to the control unit;

wherein the control unit is adapted for receiving the digital/electric signals and is connected with and controls the AC motor for regulating the rotation of the control shaft and thereby the actuation of the reciprocating pumps; and wherein the sensor means include two reference sensors that are mutually disposed along a circumferential direction of the main shaft.

2. Centralised lubrication system according to claim 1, characterised in that the reference means include teeth on a toothed rim that is disposed on a flywheel of the main shaft, and an index reference means on a side of the toothed rim, and wherein the sensor means include an index sensor for detecting a position of the index reference means.

3. Centralised lubrication system according to claim 1, characterised in that the AC motor is connected with a resolver which is adapted for providing a signal to the control unit for the actual angular position of the AC motor.

4. The lubrication system of claim 1, wherein the rotating control shaft is driven synchronously with the main shaft of the diesel engine.

5. A centralized lubrication system for lubricating cylinder faces in large diesel engines and marine engines comprising an engine piston, a main shaft of the diesel engine, at least one lubricating apparatus including a number of reciprocating pumps, a control shaft, and cams for actuating the reciprocating pumps mounted on the control shaft, an AC motor coupled to the control shaft for driving the control shaft, a detection device coupled to the main shaft for generating signals relating to the main shaft and the engine piston, and a control unit communicating with the detection device and with the AC motor for regulating rotations of the control shaft and thereby regulating actuation of the reciprocating pumps responsive to the signals received from the detection device.

6. The system of claim 5, wherein the detection device comprises a reference device coupled to the main shaft and a sensor device proximal the main shaft for directly or indirectly detecting and relaying the digital or electrical signals corresponding to a position of the reference device and thereby the angular position and the angular speed of the main shaft and the engine piston.

7. The system of claim 6, further comprising a flywheel on the main shaft, a toothed rim on the flywheel and teeth on the toothed rim, wherein the reference device comprises the teeth on the toothed rim.

8. The system of claim 7, wherein the reference device further comprises an index-reference device and wherein the sensor device comprises an index-reference sensor for detecting the angular position of the index-reference device and thereby the angular position of the main shaft and the engine piston.

9. The system of claim 7, wherein the sensor device comprises at least two reference sensors mutually disposed along a circumferential direction of the main shaft.

10. The system of claim 8, further comprising a resolver coupled to the AC motor for providing signals to the control unit indicating actual angular position of the AC motor.

11. The system of claim 6, further comprising a sensing device coupled to the AC motor and the control shaft for detecting and relaying information on absolute position of the control shaft.

12. The system of claim 11, wherein the control unit is coupled to the sensor device and to the sensing device for receiving and processing the signals and the information, regulating rotations of the control shaft and regulating actuation of the reciprocating pumps responsive to the signals and the information received.

13. The system of claim 5, further comprising a driver for synchronously driving the control shaft with the main shaft of the diesel engine.

* * * * *